United States Patent
Zhang (10) Patent No.: US 10,890,229 B2
(45) Date of Patent: Jan. 12, 2021

(54) POWER TOOL

(71) Applicant: Nanjing Chervon Industry Co., Ltd., Nanjing (CN)

(72) Inventor: Rui Zhang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 16/744,512

(22) Filed: Jan. 16, 2020

(65) Prior Publication Data
US 2020/0149609 A1 May 14, 2020

Related U.S. Application Data

(63) Continuation of application No. PCT/CN2018/092260, filed on Jun. 21, 2018.

(30) Foreign Application Priority Data

Aug. 31, 2017 (CN) .......................... 2017 1 0771957

(51) Int. Cl.
*F16F 15/121* (2006.01)
*B24B 23/00* (2006.01)
(Continued)

(52) U.S. Cl.
CPC ........ *F16F 15/1213* (2013.01); *B24B 23/005* (2013.01); *B24B 41/007* (2013.01); *B25F 5/006* (2013.01); *B25F 5/025* (2013.01)

(58) Field of Classification Search
CPC .. F16F 15/1213; B24B 23/005; B24B 41/007; B25F 5/006; B25F 5/025
(Continued)

(56) References Cited

U.S. PATENT DOCUMENTS 5,839,517 A * 11/1998 Gwinn ................. B25D 17/043
173/162.2
2010/0236806 A1 9/2010 Heilig et al.
(Continued)

FOREIGN PATENT DOCUMENTS

CN 101282822 A 10/2008
CN 207273155 U 4/2018
(Continued)

OTHER PUBLICATIONS

ISA/CN, International Search Report issued on PCT application No. CN2018/092260, dated Sep. 6, 2018, 2 pages.
(Continued)

*Primary Examiner* — Michelle Lopez
(74) *Attorney, Agent, or Firm* — Greenberg Traurig, LLP (57) ABSTRACT

A power tool includes a housing, an auxiliary handle, and a vibration damping assembly. The auxiliary handle includes a front end and a gripping portion. The vibration damping assembly includes a mass member and an elastic element. The auxiliary handle further includes an end cap arranged at a rear end of the gripping portion where the rear end is far away from the housing relative to a front end of the gripping portion. An accommodating cavity for accommodating the vibration damping assembly is formed around the gripping portion. The elastic element is arranged between a mass member and a cavity wall of the accommodating cavity. A ratio of a natural frequency W1 of the vibration damping assembly to a rotation frequency W2 of an output shaft in rotation is greater than or equal to 0.7 and less than or equal to 1.3.

14 Claims, 9 Drawing Sheets

(51) Int. Cl.
  *B24B 41/00*   (2006.01)
  *B25F 5/00*    (2006.01)
  *B25F 5/02*    (2006.01)
(58) Field of Classification Search
  USPC .................................................... 173/162.2
  See application file for complete search history.

(56) References Cited

U.S. PATENT DOCUMENTS

2012/0037391 A1\* 2/2012 Clabunde .............. B24B 41/007
                                                173/162.1
2013/0185899 A1   7/2013 Zhang et al.

FOREIGN PATENT DOCUMENTS

| DE | 102006045629 A  | 4/2008 |
| DE | 102007037049 A1 | 2/2009 |
| WO | 2009086806 A1   | 7/2009 |
| WO | 2009092468 A1   | 7/2009 |

OTHER PUBLICATIONS

EPO, extended European search report issued on European patent application No. 18852398.9, dated Aug. 26, 2020, 7 pages.

\* cited by examiner

POWER TOOL

RELATED APPLICATION INFORMATION

The present application is a continuation of International Application Number PCT/CN2018/092260, filed on Jun. 21, 2018, through which this application also claims the benefit of Chinese patent application No. CN 201710771957.X, filed on Aug. 31, 2017, the disclosures of which are incorporated herein by reference in their entirety.

TECHNICAL FIELD

The present disclosure relates to a power tool, in particular to an angle grinder.

BACKGROUND

Power tools usually generate large vibrations during operation. For example, with an angle grinder, the entire set may be caused to vibrate when a grinding disc comes into contact with a workpiece. In addition, a motor and a transmission assembly may also produce vibrations during motion transmission. Furthermore, the abrasive disc may have a certain amount of unbalance during rotation due to the specific structure of the abrasive disc, the mounting error or the like, and the amount of unbalance may cause the angle grinder to further produce large vibrations during operation. These vibrations make the user unable to operate the power tool stably. For this reason, the angle grinder is usually equipped with an auxiliary handle on the housing during design. In this way, the user can hold the power tool with both hands to achieve relatively stable operation. However, because the vibration of the power tool is too large, it is still not guaranteed that the user can stable operation, and the vibration will be transmitted to the user through the auxiliary handle, which will easily cause the user's physical discomfort.

SUMMARY

In order to solve the defects of the prior art, the disclosure aims to provide a power tool with desirable vibration damping effect.

In order to achieve the above aim, the disclosure adopts the following technical solution.

There is provided a power tool including a housing, a motor, a working head, a transmission assembly, and an auxiliary handle. The housing is formed with a main handle configured for being held by a user. The motor is arranged inside the housing and includes a driving shaft. The working head includes an output shaft and an abrasive disc connected to the output shaft, where the motor is operative to drive the output shaft. The transmission assembly is configured for transmission of power between the driving shaft and the output shaft. The auxiliary handle includes: a front end mounted onto the housing at a position adjacent to the working head, and a gripping portion extending along a center line; a vibration damping assembly, including at least one mass member and a plurality of elastic elements; and an end cap, arranged at a rear end of the gripping portion. The rear end is farther away from the housing relative to the front end. The end cap defines an accommodating cavity configured for accommodating at least part of the vibration damping assembly. The plurality of elastic elements are arranged between the at least one mass member and a cavity wall of the accommodating cavity, where a ratio of a natural frequency $W1$ of the vibration damping assembly to a rotational frequency $W2$ of the output shaft in rotation is greater than or equal to 0.7 and less than or equal to 1.3.

In a further example, the at least one mass member may be is arranged in a longitudinal plane perpendicular to the center line, and the plurality of elastic elements include a first group of elastic elements connecting the mass member to the accommodating cavity of the end cap along a first direction in the longitudinal plane, and a second group of elastic elements connecting the mass member to the accommodating cavity of the end cap in a second direction perpendicular to the first direction in the longitudinal plane.

In a further example, the plurality of elastic elements are springs each of which connecting the mass member to the auxiliary handle. And an amount of the springs is an even number.

In a further example, the even number of the springs are symmetrically arranged about a plane of symmetry.

In a further example, the end cap is detachably connected to the rear end of the gripping portion.

In a further example, the cavity wall of the accommodating cavity is formed with slots, and the plurality of elastic elements are springs each including two ends arranged between the mass member and the cavity wall of the accommodating cavity, and the end of the spring adjacent to the cavity wall of the accommodating cavity is at least partially accommodated in the slots.

In a further example, the plurality of elastic elements are springs each including two ends arranged between the mass member and the cavity wall of the accommodating cavity. The cavity wall of the accommodating cavity is provided with a mounting member for mounting the spring. The mounting member is formed with a mounting column. And the end of the spring adjacent to the cavity wall of the accommodating cavity is sleeved on the mounting column.

In a further example, the mass member includes: a main body connected to the plurality of elastic elements; and an additional portion detachably connected to the main body.

In a further example, the center line of the gripping portion passes through the mass member. The plurality of elastic elements are springs each including two ends arranged between the mass member and the cavity wall of the accommodating cavity. The springs extend in a longitudinal plane perpendicular to the center line when the vibration damping assembly is in an equilibrium state.

In a further example, the center line of the gripping portion passes through the mass member. The plurality of elastic elements are springs arranged between the mass member and the cavity wall of the accommodating cavity, an extending direction of each of the plurality of springs is perpendicular to the center line. A number of the springs is 4, and the four springs are uniformly arranged in a circumference around the center line.

In a further example, an axis about which the driving shaft of the motor rotates is perpendicular to an axis about which the output shaft rotates.

There is further provided another power tool including a housing, a motor, a working head, a transmission assembly, and an auxiliary handle. The housing is formed with a main handle configured for being held by a user. The motor is arranged inside the housing and includes a driving shaft. The working head includes an output shaft and an abrasive disc connected to the output shaft, where the motor is operative to drive the output shaft. The transmission assembly is configured for transmitting transmission of power between the driving shaft and the output shaft. The auxiliary handle is detachably mounted onto the housing at a position adjacent to the working head, and includes: a gripping portion extending along a center line, and a vibration damping assembly including at least one mass member and a plurality of elastic elements. The auxiliary handle is formed with an accommodating cavity configured for accommodating the vibration damping assembly, and the plurality of elastic elements are arranged between the at least one mass member and a cavity wall of the accommodating cavity, where a ratio of a natural frequency W1 of the vibration damping assembly to a rotational frequency W2 of the output shaft in rotation is greater than or equal to 0.7 and less than or equal to 1.3 lies in the range of 0.7 to 1.3, the interval being a closed interval. The at least one mass member is arranged in a longitudinal plane perpendicular to the center line, and the plurality of elastic elements include a first group of elastic elements connecting the mass member to the accommodating cavity along a first direction in the longitudinal plane, and a second group of elastic elements connecting the mass member to the accommodating cavity along a second direction perpendicular to the first direction in the longitudinal plane.

In a further example, the accommodating cavity includes a cavity wall, and the cavity wall is provided with mounting members for separately mounting the first group of elastic elements and the second group of elastic elements.

There is yet further provided another power tool including a housing, a motor, a working head, and an auxiliary handle. The housing is formed with a main handle configured for being held by a user, the motor is arranged inside the housing, the working head includes an output shaft, and the output shaft is driven by the motor. The auxiliary handle is detachably mounted onto the housing at a position adjacent to the working head. The auxiliary handle includes a vibration damping assembly comprising at least one mass member and a plurality of elastic elements, the auxiliary handle is formed with an accommodating cavity configured for accommodating the vibration damping assembly, the plurality of elastic elements are arranged between the at least one mass member and a cavity wall of the accommodating cavity, and a ratio of a natural frequency W1 of the vibration damping assembly to a rotational frequency W2 of the output shaft in rotation is greater than or equal to 0.7 and less than or equal to 1.3. The auxiliary handle further comprises a gripping portion extending along a center line, the at least one mass member is arranged in a longitudinal plane perpendicular to the center line, and the plurality of elastic elements comprise a first group of elastic elements connecting the mass member to the accommodating cavity along a first direction in the longitudinal plane and a second group of elastic elements connecting the mass member to the accommodating cavity along a second direction perpendicular to the first direction in the longitudinal plane.

In a further example, the accommodating cavity comprises a cavity wall, and the cavity wall is provided with mounting members for separately mounting the first group of elastic elements and the second group of elastic elements.

The present disclosure may provide the following beneficial effects. The vibration damping assembly is arranged inside the auxiliary handle, so that the vibration of the power tool can be reduced, and the problem can be avoided that the vibration transferred to the user through the auxiliary handle causes discomfort of the user's body.

DETAILED DESCRIPTION

Figure 1:
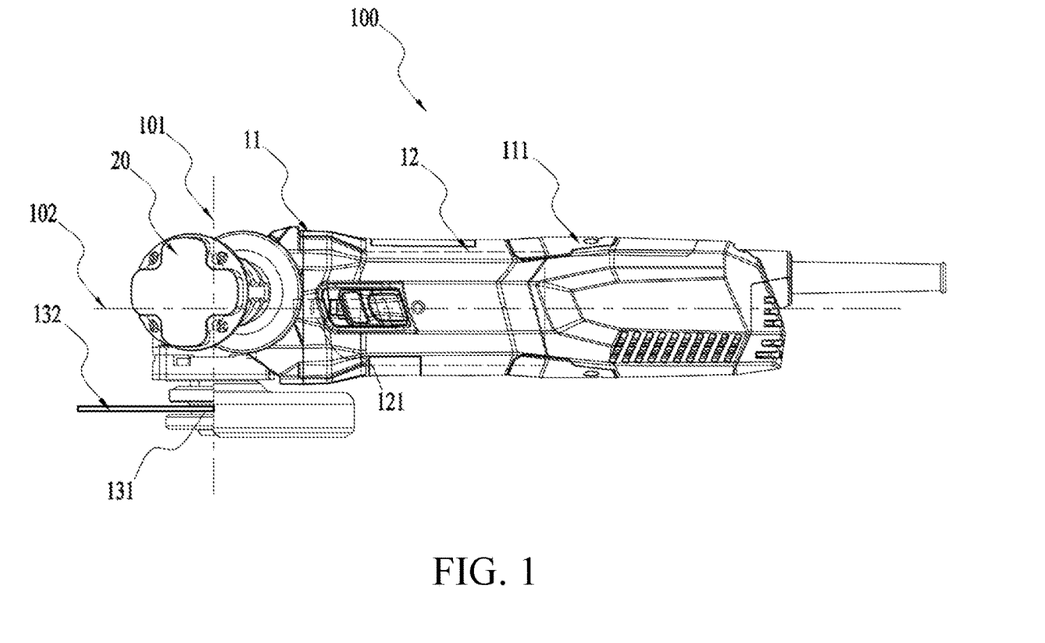
FIG. 1 is a plan view of a power tool according to a first example of the present disclosure.

The power tool 100 of the first example shown in FIG. 1 may be embodied as an angle grinder, and when the angle grinder is used for grinding operation by mounting an abrasive disc, the abrasive disc may have a certain amount of unbalance during rotation due to the specific structure of the abrasive disc, mounting errors, etc., and the amount of unbalance may cause the angle grinder to produce large vibrations during operation. For this reason, a new type of the power tool 100 provided can reduce vibration, avoid discomfort of the user's body caused by the transmission of the vibration to the user, and interfere with the operation of the user. It will of course be appreciated that the power tool may be other tools suitable for use in accordance with the spirit of the present disclosure.

Figure 2:
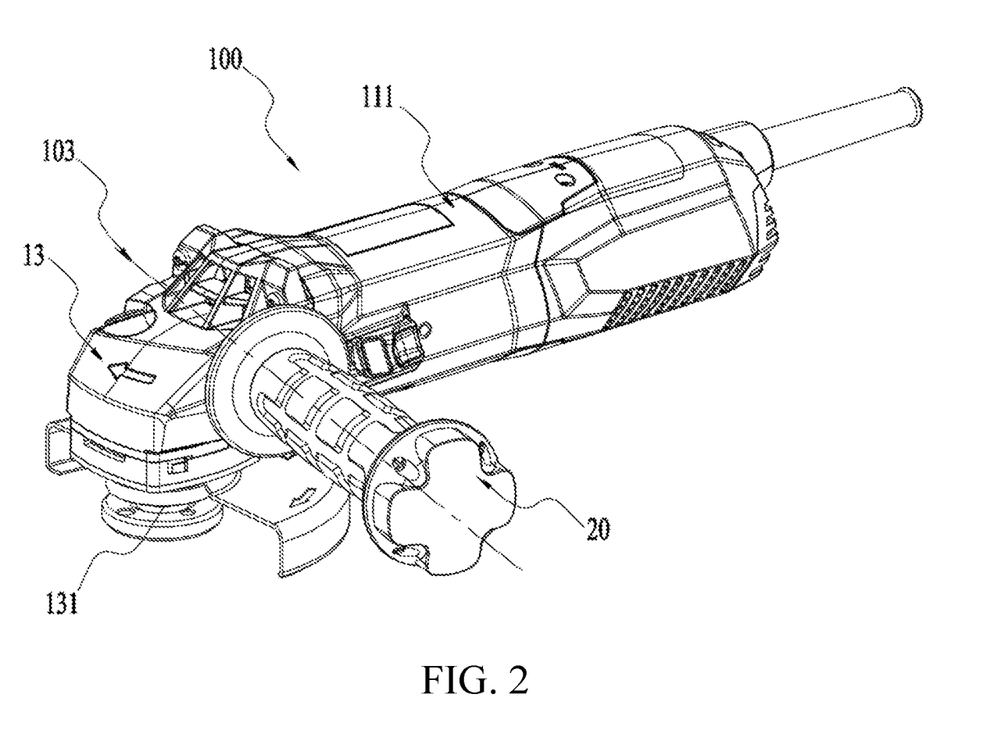
FIG. 2 is a perspective view of the power tool of FIG. 1 with an abrasive disc removed.

As illustrated in FIGS. 1 and 2, the power tool 100 includes: a housing 11, a motor 12, a working head 13, a transmission assembly and an auxiliary handle 20. The housing 11 forms a main handle 111 for a user to hold, and in the case of an angle grinder, a portion of the housing 11 forming the main handle 111 is further formed with a receiving space for receiving the motor 12, that is, the motor 12 is arranged in the main handle 111, and the motor 12 includes a driving shaft 121 for outputting power. A working head 13 is provided at an end of the housing 11, the working head 13 including an output shaft 131 and a grinding chip 132 attached to the output shaft 131. The motor 12 is used to drive the output shaft 13 to rotate around the first axis 101, and the driving shaft 121 of the motor 12 can rotate around the second axis 102. The output shaft 13 outputs power when rotating around the first axis 101 driven by the motor 12, and the output shaft 13 can drive the working accessories mounted on the output shaft 13 to rotate when rotating; for example, the output shaft 13 drives the abrasive disc 132 to rotate. The transmission assembly is used to enable power transmission between the motor 12 and the output shaft 13. For the angle grinder, the first axis 101 of rotation of the output shaft 13 is perpendicular to the second axis 102 of rotation of the driving shaft 121, and for this reason the transmission assembly enables power transfer and power reversal. The auxiliary handle 20 is detachably mounted on the housing 11, and when the user holds the main handle 111 with one hand, the auxiliary handle 20 can be held with the other hand, so that the power tool 100 can be held with both hands, thereby ensuring the stability of the user's operation.

Figure 3:
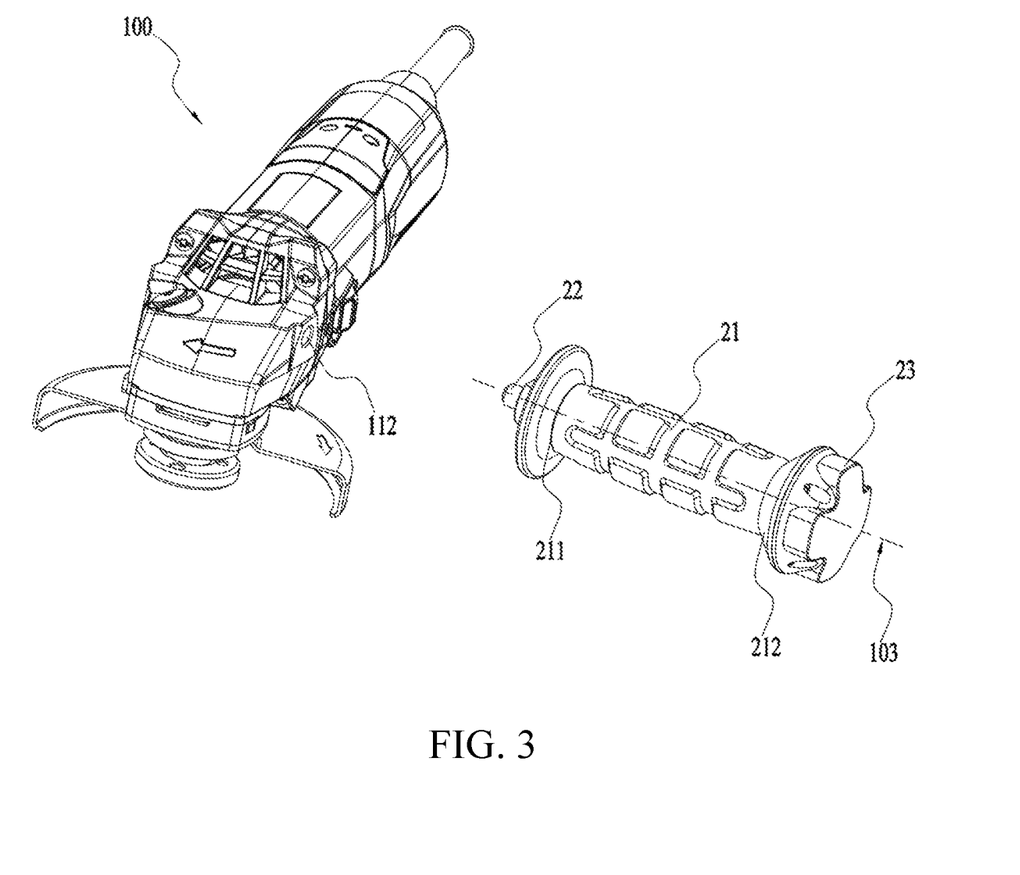
FIG. 3 is a schematic diagram of the power tool of FIG. 2 with the auxiliary handle separated from the housing.
Figure 4:
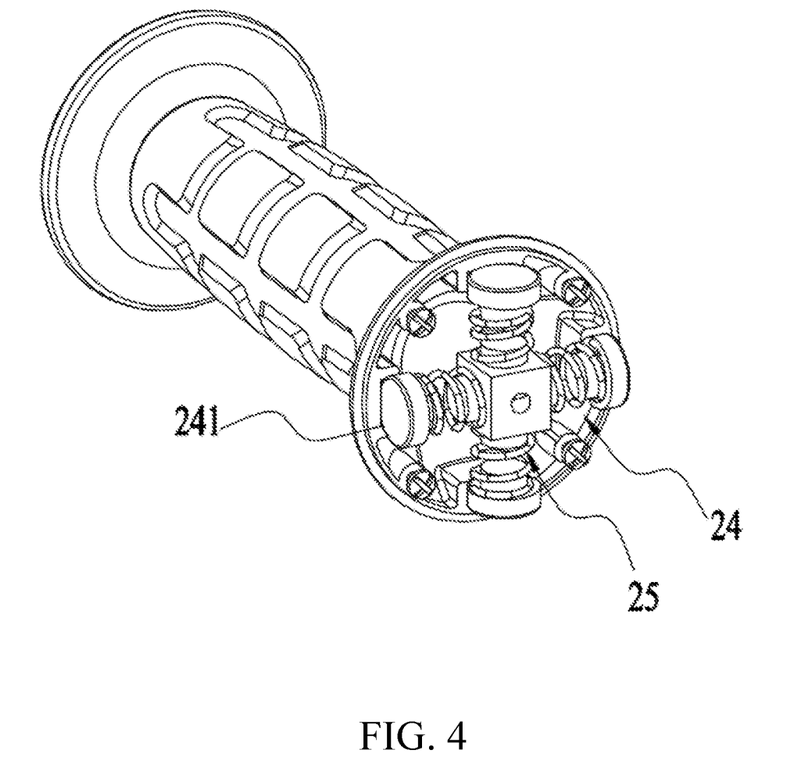
FIG. 4 is a perspective view of a partial structure of the auxiliary handle of FIG. 3.

As illustrated in FIGS. 1 to 3, the auxiliary handle 20 includes the handle 21 extends along a center line 103. The handle 21 is centered on the center line 103, and two ends of the handle 21 along the center line 103 are respectively a front end 211 and a rear end 212. The rear end 212 is far away from the housing 11 relative to the front end 211. The connecting portion 22 is provided at the front end 211 of the grip portion 21, and the connecting portion 22 is used to indirectly mount the grip portion 21 to the housing 11 near the front end 211 of the housing 11. Specifically, the connection portion 22 is a threaded post, the housing 11 is formed with a threaded hole 112, and the auxiliary handle 20 is detachably attached to the housing 11 by the engagement of the threaded post and the threaded hole 112.

As illustrated in FIGS. 3 to 6, the end cap 23 is arranged at the rear end 212 of the grip portion 21 away from the housing 11, and the end cap 23 forms the accommodating cavity 24 at least partially at the rear end 212 of the grip portion 21 when combined with the grip portion 21. In the present disclosure, the auxiliary handle 20 further includes a vibration dampening assembly 25 for dampening vibrations transmitted to the user of the power tool 100 during operation. In the power tool of the present disclosure, a ratio of the natural frequency W1 of the vibration damping assembly 25 to the rotational frequency W2 of the output shaft 13 during rotation is greater than or equal to 0.7 and less than or equal to 1.3, so that the vibration damping assembly 25 can achieve a better vibration damping effect when the working head 13 of the power tool 100 is in operation, as will be described in detail below.

Specifically, the end cap 23 and the grip portion 21 constitute a detachable connection, such as a threaded connection, a snap connection, or a detachable connection of the end cap 23 and the grip portion 21 by a screw. A part 24a of the accommodation chamber 24 formed when the end cap 23 is combined with the grip portion 21 is formed by the grip portion 21, and the other part 24b is formed by the end cap 23.

In the example of the present disclosure, the end cap 23 of the auxiliary handle 20 is formed with a receiving chamber 24 for receiving the vibration damping assembly 25 therein. In other examples of the present disclosure, an accommodating cavity 24 for receiving the vibration damping assembly 25 may be formed in the auxiliary handle 20, which is not limited thereto.

Figure 5:
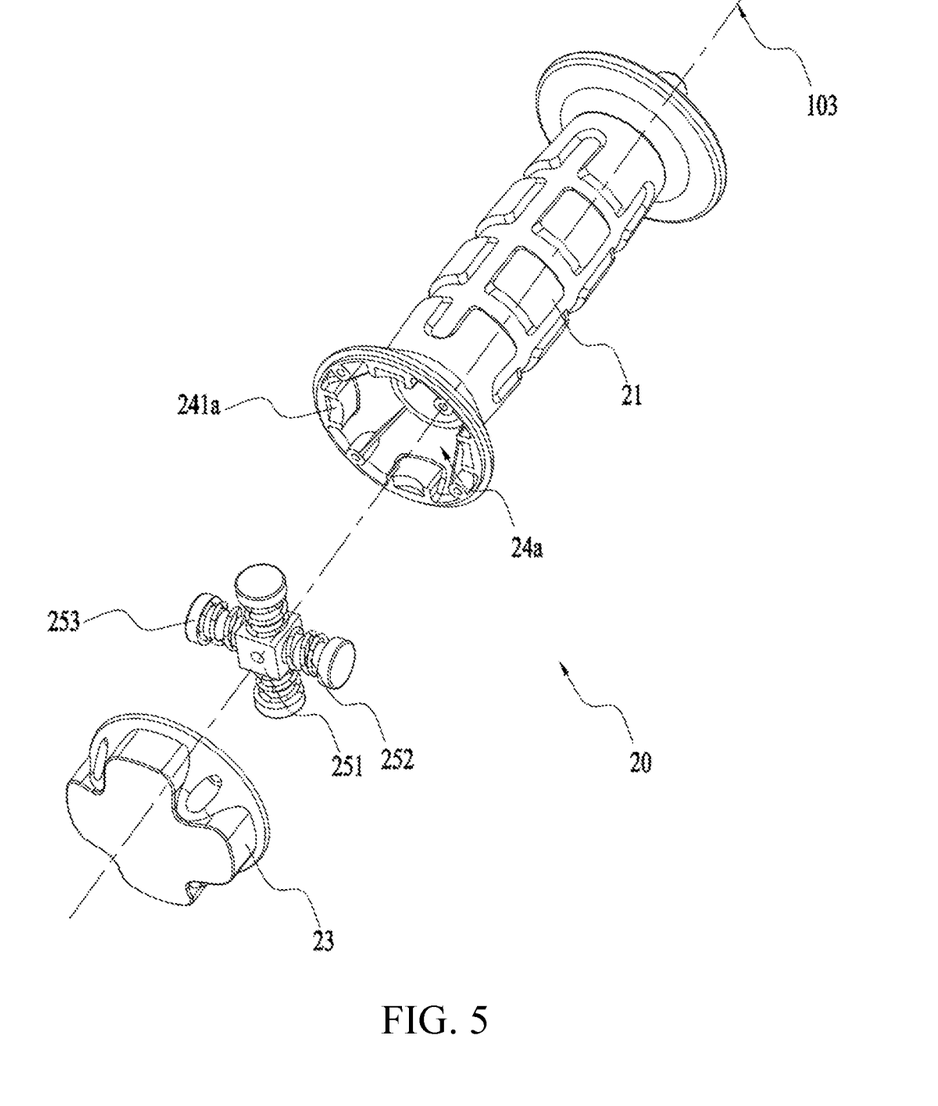
FIG. 5 is an exploded view of the auxiliary handle of FIG. 3 viewed from a perspective.
Figure 6:
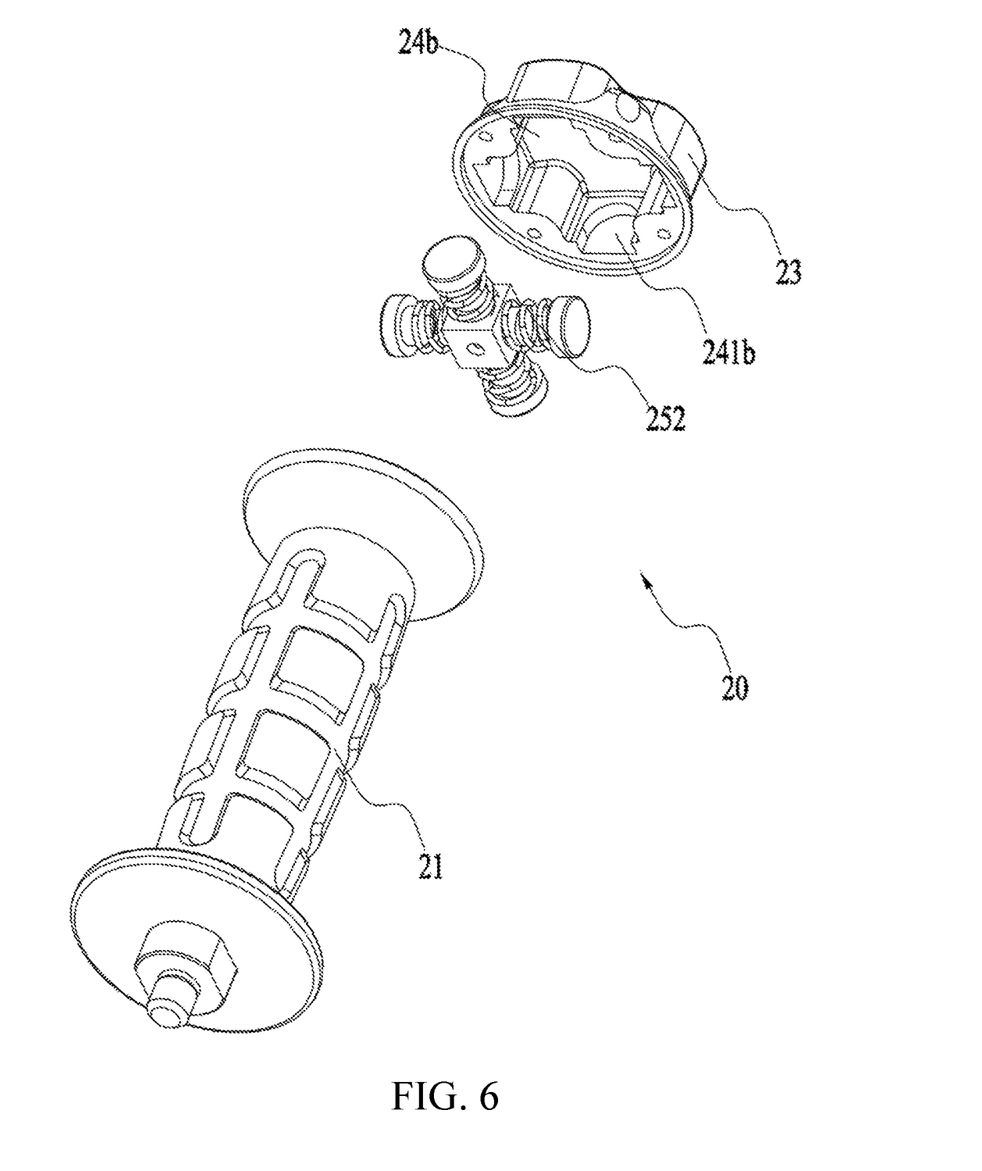
FIG. 6 is an exploded view of the auxiliary handle of FIG. 3 viewed from another perspective.

In the present example, the vibration damping assembly 25 includes a mass member 251 and an elastic member 252. The elastic member 252 is arranged between the mass member 251 and the auxiliary handle 20. Further, the elastic element 252 is a spring, a number of the spring is an even number, for example, in the present example, the vibration damping assembly 25 includes four springs. The housing 24 is centered on a center line 103 and multiple springs are symmetrically arranged about a plane passing through the center line 103. In this way, multiple springs enable the damping assembly 25 to damp vibrations in multiple directions.

Figure 8:
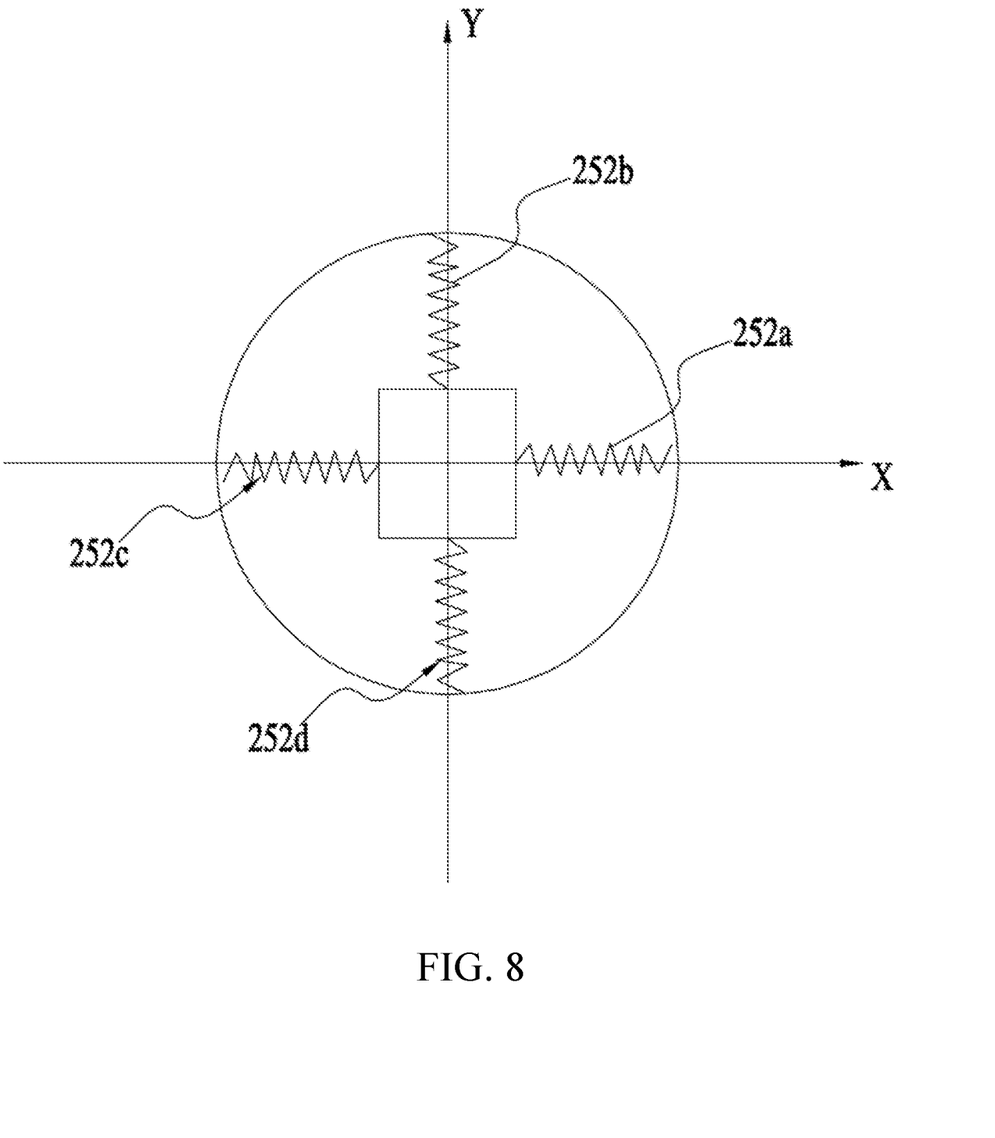
FIG. 8 is a simplified plan view of the spring and mass member of FIG. 5.

The center line 103 passes through the mass member 251, that is, the mass member 251 is arranged in the extending direction of the center line 103. When the damper assembly 25 is in an equilibrium state, the spring extends substantially in a plane perpendicular to the center line 103. Multiple springs are also evenly distributed around the mass member 251, the extending direction of the springs being perpendicular to the center line 103. That is, multiple springs are also evenly arranged in a circumference around the center line 103. For the four springs in this example, the extending directions of two adjacent springs form an included angle of 90 degrees, and the two opposite springs extend in a straight line, for example, as illustrated in FIG. 8, the spring 252a and the spring 252c are arranged in a first direction, i.e., the X direction, the spring 252b and the spring 252d are arranged in a second direction, i.e., the Y direction, the spring 252a and the spring 252c are symmetrically arranged on both sides of the mass member 251 in the X direction, and the spring 252b and the spring 252d are arranged on both sides of the mass member 251 in the Y direction. Specifically, in a longitudinal plane perpendicular to center line 103, multiple elastic elements 252 include a first group of elastic elements 252a, 252c connecting mass member 251 to housing cavity 24 of end cap 23 in a first direction in the longitudinal plane and a second group of elastic elements 252b, 252d connecting mass member 251 to housing cavity 24 of end cap 23 in a second direction perpendicular to the first direction.

Figure 7:
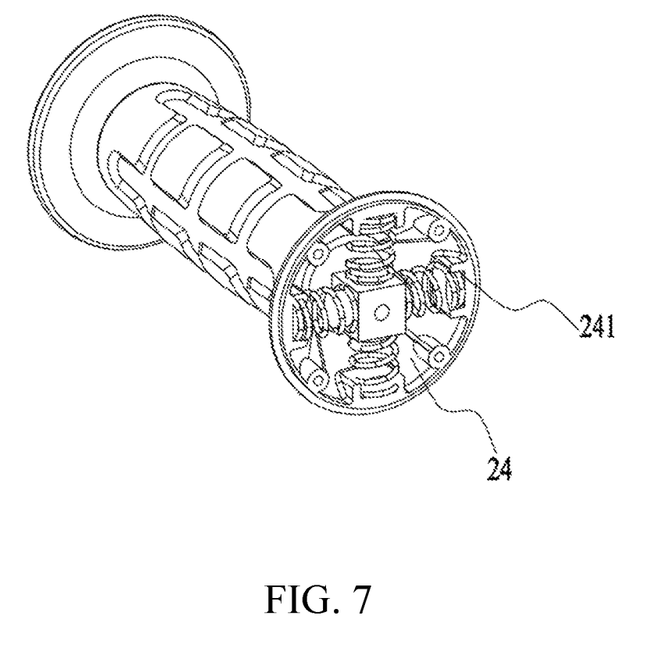
FIG. 7 is a schematic diagram of the auxiliary handle of FIG. 3 with a spring directly abutting against the slot.

For stable spring mounting, the cavity wall of the accommodation cavity 24 is formed with a slot 241, a portion 241a of the slot 241 is formed by the inner wall of the grip 21, and another portion 241b of the slot 241 is formed by the inner wall of the cap 23, and when the cap 23 and the grip 21 are combined, a complete slot 241 is formed at the cavity wall of the accommodation cavity 24. Of course, those skilled in the art will understand that the structure of the slot 241 is not limited thereto. In the present example, the vibration damping assembly 25 further includes a mounting member 253 for mounting the spring, a portion of the mounting member 253 is received in the slot 241, the mounting member 253 is further formed with a mounting column 253a at least partially disposed outside the slot 241, one end of the spring close to the wall of the receiving chamber 24 is fitted over the mounting column 253a, and the other end is connected to the mass member 251. It will be understood, of course, that the end of the spring close to the wall of the housing chamber 24, as shown in FIG. 7, may also be directly held against the bottom of the slot 241, in which case the spring is partially housed in the slot 241.

In the present example, the mass member of the mass member 251 is fixed. In other examples, the mass member 251 may be formed of two parts, and the mass member 251 may include a main body with a fixed mass member and an additional part with a variable mass member, the additional part being detachably connected to the main body, and the user may replace the additional part with a different mass member as needed.

The natural frequency refers to the natural angular frequency. The natural frequency W1 of the vibration damping module 25 refers to a first-order frequency in a certain direction when the mass member 251 vibrates.

In the present example, when the elastic element 252 is a spring, the natural frequency W1 of the vibration damping assembly 25 is a first order frequency in the direction in which the mass member 251 vibrates in the extending direction of the spring. As illustrated in FIG. 8, when the mass member 251 vibrates in the X direction, the first order frequency of the mass member 251 in the X direction is the natural frequency W1 of the vibration damping assembly 25 of the present disclosure.

Specifically, in the present example, the relationship between the natural frequency W1 of the vibration damping assembly 25 and the spring and mass member 251 is represented by the following equation:

$$W1 = \sqrt{\frac{2K}{M}}$$

Where K is the stiffness coefficient of the spring, and M is the mass of the mass member 251.

And the relationship between the rotational frequency W2 of the output shaft 13 and the frequency f of rotation of the output shaft 13 is represented by the following equation:

$$W2 = 2\pi * f$$

a ratio of the natural frequency W1 of the vibration damping assembly 25 of the power tool 100 having the working head 13 to the rotational frequency W2 of the output shaft 13 is greater than or equal to 0.7 and less than or equal to 1.3, and it is typical to evaluate the vibration damping effect of the hand-held power tool 100, that is, to evaluate the vibration damping effect of the hand-held power tool 100. Namely:

$$0.7 \leq \frac{W1}{W3} \leq 1.3$$

Namely:

$$0.7 \leq \sqrt{\frac{2K}{M}} \Big/ (2\pi * f) \leq 1.3$$

It is known that the frequency f of rotation of the output shaft 13 for a particular power tool 100 is typically varied within a range or preset to a fixed value, such that the natural frequency W1 of the vibration damping assembly 25 can be set according to the frequency f of the output shaft 13, and further, the stiffness coefficient K of the spring and the mass member M of the mass member 251 can be set according to the natural frequency W1 of the vibration damping assembly 25, thereby achieving a better vibration damping effect.

Figure 9:
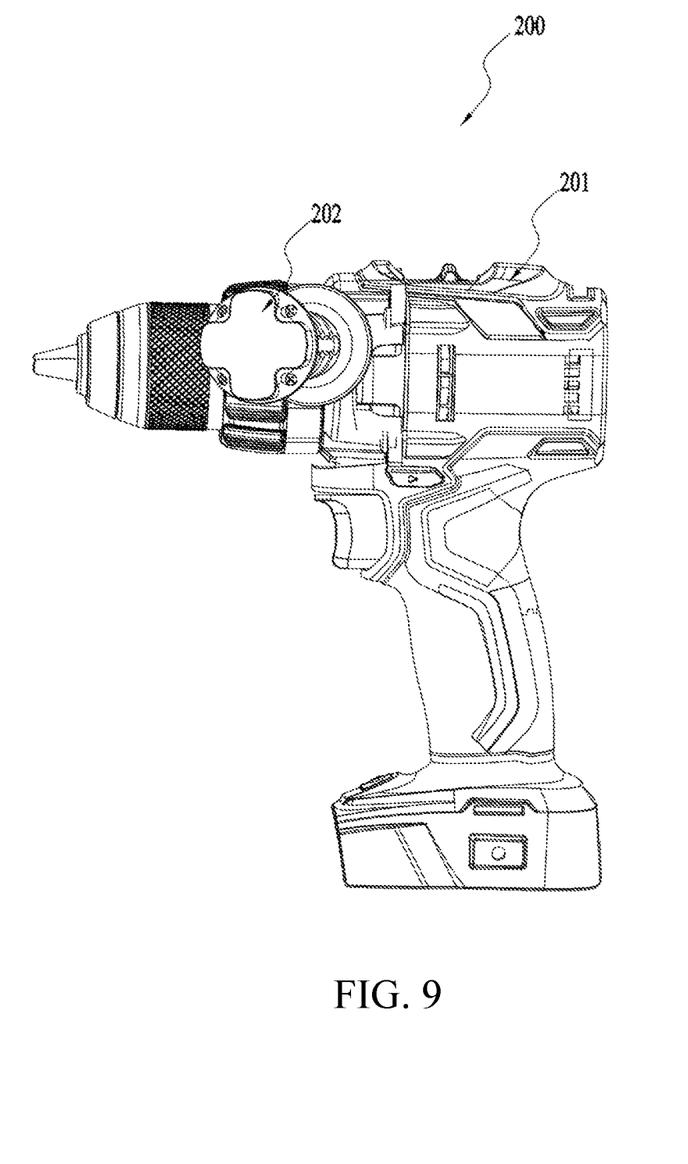
FIG. 9 is a plan view of a power tool of a second example according to the present disclosure.

As illustrated in FIG. 9, the power tool 200 of the second example may be a percussion drill, and an auxiliary handle 202 is mounted on a housing 201 of the percussion drill, and the specific structure of the auxiliary handle 202 may be the same as that of the auxiliary handle 20 of the first example, which is not described in detail.

Of course, it is understood that the power tool of the present disclosure may also be other tools with relatively large vibration, such as a sander, an electric hammer, an impact wrench, etc., which however are not to be detailed herein again.

The foregoing description has illustrated and explained the basic principles, principal features, and advantages of the present disclosure. It should be understood by those skilled in the art that the foregoing examples will not limit the present disclosure in any way, and all technical solutions obtained by means of equivalent substitution or equivalent transformation shall all fall in the scope of protection of the present disclosure.

What is claimed is:

1. A power tool, comprising:
a housing formed with a main handle configured for being held by a user;
a motor arranged inside the housing and comprising a driving shaft;
a working head comprising an output shaft wherein the output shaft is driven by the motor; and
a transmission assembly configured for transmitting power between the driving shaft and the output shaft;
wherein the power tool further comprises:
an auxiliary handle, comprising:
a front end mounted onto the housing at a position adjacent to the working head;
a gripping portion extending along a center line;
a vibration damping assembly comprising at least one mass member and a plurality of elastic elements; and
an end cap arranged at a rear end of the gripping portion;
wherein the rear end is farther away from the housing relative to the front end, the end cap defines an accommodating cavity configured for accommodating at least part of the vibration damping assembly, and the plurality of elastic elements are arranged between the at least one mass member and a cavity wall of the accommodating cavity, wherein a ratio of a natural frequency W1 of the vibration damping assembly to a rotational frequency W2 of the output shaft in rotation is greater than or equal to 0.7 and less than or equal to 1.3.

2. The power tool of claim 1, wherein the at least one mass member is arranged in a longitudinal plane perpendicular to the center line, and the plurality of elastic elements comprise a first group of elastic elements connecting the mass member to the accommodating cavity of the end cap along a first direction in the longitudinal plane, and a second group of elastic elements connecting the mass member to the accommodating cavity of the end cap in a second direction perpendicular to the first direction in the longitudinal plane.

3. The power tool of claim 1, wherein the plurality of elastic elements are springs each of which connecting the mass member to the auxiliary handle, and an amount of the springs is an even number.

4. The power tool of claim 1, wherein the end cap is detachably connected to the rear end of the gripping portion.

5. The power tool of claim 1, wherein the cavity wall of the accommodating cavity is formed with slots, and the plurality of elastic elements are springs, each of the springs comprises two ends arranged between the mass member and the cavity wall of the accommodating cavity, and the end of each of the springs adjacent to the cavity wall of the accommodating cavity is at least partially accommodated in the slots.

6. The power tool of claim 1, wherein the plurality of elastic elements are springs, each of the springs comprises two ends arranged between the mass member and the cavity wall of the accommodating cavity, the cavity wall of the accommodating cavity is provided with a mounting member for mounting the spring, the mounting member is formed with a mounting column, and the end of each of the springs adjacent to the cavity wall of the accommodating cavity is sleeved on the mounting column.

7. The power tool of claim 1, wherein the mass member comprises:
a main body connected to the plurality of elastic elements; and
an additional portion detachably connected to the main body.

8. The power tool of claim 1, wherein the center line of the gripping portion passes through the mass member, the plurality of elastic elements are springs, each of the springs comprises two ends arranged between the mass member and the cavity wall of the accommodating cavity, and the springs extend in a longitudinal plane perpendicular to the center line when the vibration damping assembly is in an equilibrium state.

9. The power tool of claim 1, wherein the center line of the gripping portion passes through the mass member, the plurality of elastic elements are springs arranged between the mass member and the cavity wall of the accommodating cavity, an extending direction of each of the plurality of springs is perpendicular to the center line, a number of the springs is 4, and the four springs are uniformly arranged in a circumference around the center line.

10. The power tool of claim 1, wherein an axis about which the driving shaft of the motor rotates is perpendicular to an axis about which the output shaft rotates.

11. A power tool, comprising:
a housing formed with a main handle configured for being held by a user;
a motor arranged inside the housing and comprising a driving shaft;
a working head comprising an output shaft wherein the output shaft is driven by the motor; and
a transmission assembly configured for transmitting power between the driving shaft and the output shaft;
wherein the power tool further comprises:
an auxiliary handle detachably mounted onto the housing at a position adjacent to the working head, the auxiliary handle comprising:
a gripping portion extending along a center line;
a vibration damping assembly comprising at least one mass member and a plurality of elastic elements;
wherein the auxiliary handle is formed with an accommodating cavity configured for accommodating the vibration damping assembly, and the plurality of elastic elements are arranged between the at least one mass member and a cavity wall of the accommodating cavity, and a ratio of a natural frequency W1 of the vibration damping assembly to a rotational frequency W2 of the output shaft in rotation is greater than or equal to 0.7 and less than or equal to 1.3; and
wherein the at least one mass member is arranged in a longitudinal plane perpendicular to the center line, and the plurality of elastic elements comprise a first group of elastic elements connecting the mass member to the accommodating cavity along a first direction in the longitudinal plane, and a second group of elastic elements connecting the mass member to the accommodating cavity along a second direction perpendicular to the first direction in the longitudinal plane.

12. The power tool of claim 11, wherein the accommodating cavity comprises a cavity wall, and the cavity wall is provided with mounting members for separately mounting the first group of elastic elements and the second group of elastic elements.

13. A power tool, comprising:
a housing formed with a main handle configured for being held by a user;
a motor arranged inside the housing;
a working head comprising an output shaft, wherein the output shaft is driven by the motor;
wherein the power tool further comprises:
an auxiliary handle detachably mounted onto the housing at a position adjacent to the working head, wherein the auxiliary handle further comprises a vibration damping assembly comprising at least one mass member and a plurality of elastic elements;
wherein the auxiliary handle is formed with an accommodating cavity configured for accommodating the vibration damping assembly, the plurality of elastic elements is arranged between the at least one mass member and a cavity wall of the accommodating cavity, and a ratio of a natural frequency W1 of the vibration damping assembly to a rotational frequency W2 of the output shaft in rotation is greater than or equal to 0.7 and less than or equal to 1.3; and
wherein the auxiliary handle further comprises a gripping portion extending along a center line, the at least one mass member is arranged in a longitudinal plane perpendicular to the center line, and the plurality of elastic elements comprise a first group of elastic elements connecting the mass member to the accommodating cavity along a first direction in the longitudinal plane and a second group of elastic elements connecting the mass member to the accommodating cavity along a second direction perpendicular to the first direction in the longitudinal plane.

14. The power tool of claim 13, wherein the accommodating cavity comprises a cavity wall, and the cavity wall is provided with mounting members for separately mounting the first group of elastic elements and the second group of elastic elements.

* * * * *